Dec. 30, 1952 D. C. HUBBARD Re. 23,609
POLE GUARD.
Original Filed Aug. 8. 1949
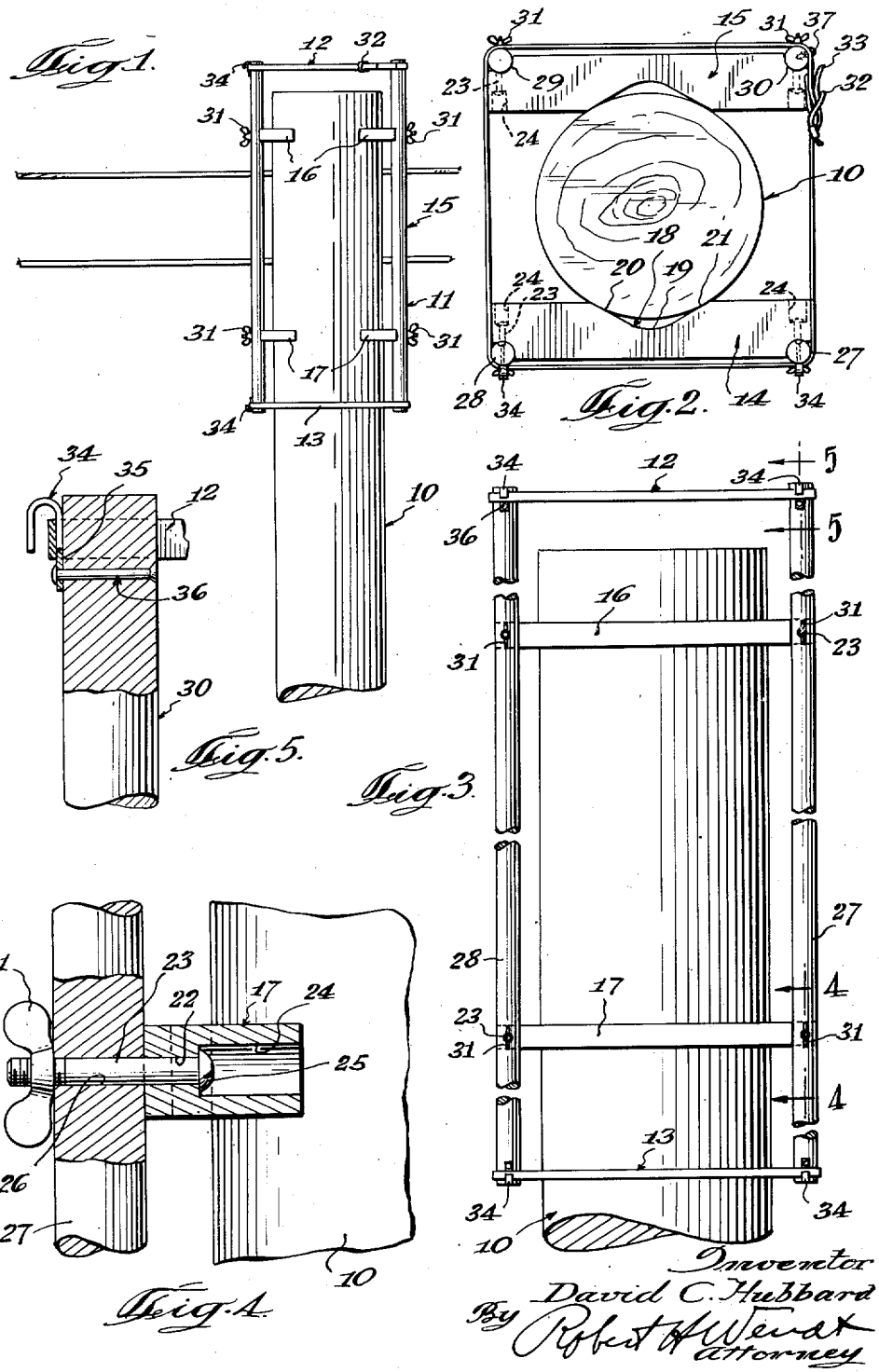

Reissued Dec. 30, 1952 Re. 23,609

UNITED STATES PATENT OFFICE 23,609

POLE GUARD

David C. Hubbard, Centralia, Mo., assignor to A. B. Chance Company, Centralia, Mo., a corporation of Missouri Original No. 2,534,170, dated December 12, 1950, Serial No. 109,145, August 8, 1949. Application for reissue December 7, 1951, Serial No. 260,380

10 Claims. (Cl. 174—5)

Matter enclosed in heavy brackets [ ] appears in the original patent but forms no part of this reissue specification; matter printed in italics indicates the additions made by reissue.

The present invention relates to pole guards, and is particularly concerned with insulating guards adapted to be applied to the poles of high tension transmission lines when poles are being manipulated or adjacent energized high voltage lines to install or remove a pole.

It has been found that creosoted poles are especially hazardous when they are manipulated adjacent energized high voltage lines, in some cases exceeding 34,500 volts. A number of fatalities have resulted from accidental contact of the pole with primary conductors as poles are being installed.

One of the objects of the invention is the provision of an improved protective device which is adapted to prevent energized conductors from contacting line poles.

Another object of the invention is the provision of an improved protective device which is adapted to prevent contact of the line pole with live conductors, either from the side or top, and which in addition provides a wide air-gap to insure against creepage currents or flash-over from the conductor to the pole.

Another object of the invention is the provision of an improved pole guard which provides an air-gap between the pole and all live conductors, to prevent flash-over from the conductor to the pole, and in which surface leakage currents are minimized by providing long leakage paths and a minimum contact area between any conductor engaging the guard and the engagement of the guard with the pole itself.

Another object of the invention is the provision of an improved pole guard which is sturdy, capable of being collapsed into a small space, easy to carry, and easy to assemble, capable of economical manufacture, and adapted to provide safety for linemen at the highest voltages usually employed.

Other objects and advantages of the invention will be apparent from the following description and the accompanying drawings, in which similar characters of reference indicate similar parts throughout the several views.

Referring to the single sheet of drawings accompanying this specification,

Fig. 1 is a side elevational view of a pole guard embodying the invention, installed upon a pole, and shown adjacent two live line conductors;

Fig. 2 is a top plan view of the pole guard of Fig. 1;

Fig. 3 is a side elevational view;

Fig. 4 is a fragmentary sectional view, taken on the plane of the line 4—4 of Fig. 3, looking in the direction of the arrows;

Fig. 5 is a fragmentary sectional view, taken on the plane of the line 5—5 of Fig. 3, looking in the direction of the arrows.

Referring to Figs. 1 to 3, 10 indicates a line pole which has been provided with a pole guard embodying the invention, and indicated in its entirety by the numeral 11.

The pole guard 11 preferably comprises a pair of tension members 12 and 13 adjacent the top and the bottom for binding the frames to the pole, and a pair of vertical frame assemblies 14, 15, which, when combined with the pole, form a guard.

The two vertical frame assemblies 14 and 15 may be identical in construction, except for minor details later to be mentioned. Each of the frame assemblies may include an upper and a lower horizontal frame member 16, 17 of wood or other suitable insulating material. The wood employed is preferably kiln dried and of high insulating value, and covered with one or more coatings of insulating varnish.

The two frame members 16, 17 are formed with a V-shaped groove 18, the apex of which is rounded at 19; and the two sides 20 and 21 are at such an angle, preferably acute, with respect to the pole that there is only a spot contact with the sides 20, 21 of the V-groove. This minimizes creepage currents at this point. It also gives double opposed bearing contact with the pole for each frame member 16, 17.

Each frame member 16, 17 is provided with a through bore 22 (Fig. 4) for passing a screw bolt 23 and communicating with an enlarged counterbore 24 for passing and receiving the head 25 of the screw bolt. Thus the head and shank of the screw bolt 23 may be so recessed and guarded inside the frame members 16 and 17 that the metal screw bolts do not facilitate any flash-over. The bores and counterbores 22, 24 are arranged adjacent the ends of the frame members 16, 17 so that the screw bolts 23 may pass through bores 26 in the corner poles, of which there are four, indicated at 27—30.

The poles 27—30 are also of similar insulating wood, similarly treated, and may be of suitable size and diameter to withstand the forces exerted upon them. In general, they may be of the same size as the insulating poles which are used to manipulate energized line conductors. The length of the poles 27—30 is preferably sufficient so that the poles extend from a point spaced from the upper end of the transmission line pole downwardly of the pole, past all live conductors, when the transmission line pole has its butt end resting on the ground, before it is inserted into the hole in the earth.

Thus there is no danger at any time of the line pole coming in contact with live conductors because the live conductors will engage the insulating poles 27—30 which are carried by the vertical frame assemblies 14 and 15.

The respective poles 27—30 are clamped to the frame members 16, 17 by wing nuts 31. When the two poles 27 and 28, for example, are clamped to the frame members 16 and 17, this provides a vertical frame assembly for engaging one side of the pole, as indicated by No. 14.

The tension members 13 may consist of belts of suitable insulating fabric, such as a webbing belt impregnated with insulating and waterproofing varnish; and these belts 13 are of sufficient length to extend around the assembly when it it is attached to a pole 10. At one end the belt is provided with a buckle 32, through which the free end 33 may pass so that the belt can be tightened about the frame members. In order to prevent the belt from slipping off the ends of certain poles, the ends of poles 27 and 28 are preferably provided with hook member 34, this member being of substantially U-shape, with one of the legs elongated to provide an attaching flange 35.

A rivet 36 passing through the attaching flange 35 and through the pole 30 secures the hook 34 to each pole 27, 28. The hooks 34 are turned downwardly at the top and upwardly at the bottom. The straps are preferably attached adjacent the buckle end of one of the frames by means of suitable wood screws 37.

The method of manipulating and using the guard is as follows: The guard is applied to a line pole while the pole is on the ground and before it is raised through the live conductors. The two vertical frame assemblies 14 and 15 are placed opposite each other at the end of the line pole that is to be raised between the conductors.

The device is so positioned that the upper strap 12 is located beyond the upper end of the line pole; and this strap may be pulled snugly around the ends of the poles of the two frame assemblies and secured by means of the buckle 32. The hooks then prevent the strap from sliding off the ends of the poles.

Then the second and lower strap 13 may be pulled firmly around the lower ends of the frames and buckled. This causes the unsupported ends of the guard members or poles 27—30 to bow inwardly slightly at the end and outwardly at the middle and applies gripping pressure to the line pole at the V-shaped notches 18.

As previously stated, the length of the guard should be such that it prevents the live conductors from engaging the pole in every position which the pole may assume while it is being installed or lifted between the live conductors.

After the line pole has been raised into position and set, it is only necessary to release the lower strap 13, spreading the two frame members 17 at the bottom, which moves the upper ends of the guard poles 27—30 toward each other and releases the gripping pressure of the upper strap 12.

The hooks of the frame assembly 14 may then be lifted sufficiently to disengage the upper strap 12 from the frame assembly 14, thereby separating the guard into two parts, the frame assembly 15, which carries the straps, and the frame assembly 14, which has been disengaged from the straps.

Thereafter the two frames can readily be removed from the pole by lifting the upper strap, which is still closed over the top of the pole, the lower strap 13 having been opened. The wing nuts are provided to permit easy disassembly of the frames so they can be packed or stored in a small space.

The guard may also be used upon a pole that is to be removed. In such case the top strap 12 is adjusted and buckled to provide a loop of suitable size, which is determined by trial or measurement. A precise adjustment is not required.

The two frames are then raised, and the frame with the hooks 34 is passed through the buckled upper loop or belt 12 as the lower ends of this frame are spread outward and the hooks are hooked over the belt 12. After the upper strap 12 is engaged by both frames, the guard is adjusted for proper height on the line pole; and then the lower ends are brought in toward the pole and secured on it by means of the strap 13. In some cases it may be necessary then to tighten or adjust the upper strap 12.

The present pole guards are adapted to prevent contact of the pole with live conductors. The spacing of the parts of the guard from the line pole provides an air-gap which prevents a flash-over from the conductor to the pole. The contact between the guard members 27—30 and the live conductors is merely a point contact and a long leakage path is provided along the guard members to the line pole so that surface leakage currents are minimized.

When a pole guard of the present construction is employed, fatalities, which might otherwise result from accidental contact of the pole with primary conductors, may be avoided. The danger is especially great with creosoted poles; and the present invention fulfills an urgent need for a protective device for preventing energized conductors from contacting line poles.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an insulated line pole assembly for safe installation between existing energized line conductors, the combination of the line pole with a pair of insulating guard units, each guard unit including a pair of wood pole engaging members of substantially rectangular shape, provided with a tapered groove having a rounded base for engaging poles of different sizes, the pole engaging members of each unit being parallel to each other and the grooves being aligned with each other, an insulating wooden pole carried by each of the outer corners of the pole engaging members of each unit, the insulating wooden poles being of sufficient length to extend from a point below the line conductors to a point beyond the top of the line pole, and a pair of insulating straps, each strap being located to extend about the end portions of the four poles of the two frame units to draw them together and to cause the pole engaging members to clamp the line pole with a frictional engagement and clamping force sufficient to insure the fixity of the pole guard on the line pole.

2. In an insulated line pole assembly for safe installation between existing energized line conductors, the combination of the line pole with a pair of insulating guard units, each guard unit including a pair of wood pole engaging members of substantially rectangular shape, provided with a tapered groove having a rounded base for engaging poles of different sizes, the pole engaging members of each unit being parallel to each other and the grooves being aligned with each other, an insulating wooden pole carried by each of the outer corners of the pole engaging members of each unit, the insulating wooden poles being of sufficient length to extend from a point below the line conductors to a point beyond the top of the line pole, and a pair of insulating straps, each strap being located to extend about the end portions of the four poles of the two frame units to draw them together and to cause the pole engaging members to clamp the line pole with a frictional engagement and clamping force sufficient to insure the fixity of the pole guard on the line pole, the said insulating strap being fixedly secured to the pole end portions of one frame unit and the other pole end portion being provided with inwardly directed hooks for engaging the strap and preventing it from passing off the ends of the pole end portions.

*3. In an insulated line pole assembly for safe installation between existing energized line conductors, the combination of a line pole with a pair of insulating guard units, each guard unit including a pair of insulating line pole-engaging members provided with tapered grooves for engaging line poles of different sizes, the line pole-engaging members of each unit being spaced from each other, and the grooves being aligned with each other, insulating poles carried by the line pole-engaging members of each unit, the insulating poles being of sufficient length to extend from a point below the line conductors to a point beyond the top of the line pole, and insulating tension members located to draw the end portions of the insulating poles of the two frame units toward the line pole and to cause the line pole-engaging members to clamp the line pole with a frictional engagement and clamping force sufficient to insure the fixity of the pole guard on the line pole.*

*4. In an insulated line pole assembly for safe installation between existing energized line conductors, the combination of a line pole with a pair of insulating guard units, each guard unit including a pair of insulating line pole-engaging members provided with tapered grooves for engaging line poles of different sizes, the line pole-engaging members of each unit being spaced from each other, and the grooves being aligned with each other, insulating poles carried by the line pole-engaging members of each unit, the insulating poles being of sufficient length to extend from a point below the line conductors to a point beyond the top of the line pole, and insulating tension members located to draw the end portions of the insulating poles of the two frame units toward the line pole and to cause the line pole-engaging members to clamp the line pole with a frictional engagement and clamping force sufficient to insure the fixity of the pole guard on the line pole, the width and length of said insulating line pole-engaging members being sufficient to space the insulating poles from the line pole by a distance which prevents a flash-over from a line conductor engaging one or more of the insulating poles.*

*5. In an insulated line pole assembly for safe installation between existing energized line conductors, the combination of a line pole with a pair of insulating guard units, each guard unit including a pair of insulating line pole-engaging members provided with tapered grooves for engaging line poles of different sizes, the line pole-engaging members of each unit being spaced from each other, and the grooves being aligned with each other, insulating poles carried by the line pole-engaging members of each unit, the insulating poles being of sufficient length to extend from a point below the line conductors to a point beyond the top of the line pole, and insulating tension members located to draw the end portions of the insulating poles of the two frame units toward the line pole and to cause the line pole-engaging members to clamp the line pole with a frictional engagement and clamping force sufficient to insure the fixity of the pole guard on the line pole, said tension members being located adjacent the lower end of the insulating poles and adjacent the upper end of the insulating poles, the upper tension member forming an additional guard for protecting the upper end of the line pole from contact with energized conductors.*

*6. In an insulated line pole assembly for safe installation between existing energized line conductors, the combination of a line pole with a pair of insulating guard units, each guard unit including a pair of insulating line pole-engaging members provided with tapered grooves for engaging line poles of different sizes, the line pole-engaging members of each unit being spaced from each other, and the grooves being aligned with each other, insulating poles carried by the line pole-engaging members of each unit, the insulating poles being of sufficient length to extend from a point below the line conductors to a point beyond the top of the line pole, and insulating tension members located to draw the end portions of the insulating poles of the two frame units toward the line pole and to cause the line pole-engaging members to clamp the line pole with a frictional engagement and clamping force sufficient to insure the fixity of the pole guard on the line pole, the insulating poles being round in cross-sectional shape to provide sufficient strength so that the insulating poles have a point contact with any round line conductor, resulting in a minimum contact area and a minimum possibility of surface leakage of electrical current from the conductor to the line pole.*

*7. A transmission line pole guard comprising a pair of separable insulating frames for mounting on a line pole, each frame including a lower insulating pole-engaging member and an upper insulating pole-engaging member for extending transversely to the line pole, and the two pole-engaging members of each frame being joined together by a pair of guard poles of insulating material adapted to extend longitudinally of the line pole and to keep line conductors from engaging the line pole while the line pole is being moved adjacent the line conductors, and means for clamping said pole-engaging members on a line pole to secure the frames on the line pole with the insulating poles spaced from each other about the line pole to prevent any conductor which bridges two insulating poles from engaging the line pole.*

*8. A transmission line pole guard comprising a pair of separable insulating frames for mounting on a line pole, each frame including a lower insulating pole-engaging member and an upper insulating pole-engaging member for extending*

*transversely to the line pole, and the two pole-engaging members of each frame being joined together by a pair of guard poles of insulating material adapted to extend longitudinally of the line pole and to keep line conductors from engaging the line pole while the line pole is being moved adjacent the line conductors, and means for clamping said pole-engaging members on a line pole to secure the frames on the line pole with the insulating poles spaced from each other about the line pole to prevent any conductor which bridges two insulating poles from engaging the line pole, said clamping means comprising tension means acting on the insulating poles to draw them toward the line pole.*

*9. A transmission line pole guard comprising a pair of separable insulating frames for mounting on a line pole, each frame including a lower insulating pole-engaging member and an upper insulating pole-engaging member for extending transversely to the line pole, and the two pole-engaging members of each frame being joined together by a pair of guard poles of insulating material adapted to extend longitudinally of the line pole and to keep line conductors from engaging the line pole while the line pole is being moved adjacent the line conductors, and adjustable securing means for drawing the pole-engaging members into frictional engagement with line poles of different sizes.*

*10. A transmission line pole guard comprising a pair of separable insulating frames for mounting on a line pole, each frame including a lower insulating pole-engaging member and an upper insulating pole-engaging member for extending transversely to the line pole, and the two pole-engaging members of each frame being joined together by a pair of guard poles of insulating material adapted to extend longitudinally of the line pole and to keep line conductors from engaging the line pole while the line pole is being moved adjacent the line conductors, and adjustable securing means for drawing the pole-engaging members into frictional engagement with line poles of different sizes, the said pole-engaging members being provided with tapered grooves to center line poles of different sizes, with respect to the insulating guard poles.*

DAVID C. HUBBARD.

REFERENCES CITED

The following references are of record in the file of this patent or the original patent:

UNITED STATES PATENTS

| Number | Name | Date |
|---|---|---|
| 1,200,976 | Phelps | Oct. 10, 1916 |
| 1,369,119 | McKnight | Feb. 22, 1921 |
| 1,765,823 | Burke | June 24, 1930 |
| 1,979,688 | Hamer | Nov. 6, 1934 |

OTHER REFERENCES

Publication "Electrical Record," February 1909, page 80. (Copy in Div. 65, Patent Office.)